United States Patent
Fall et al.

(10) Patent No.: US 9,423,272 B2
(45) Date of Patent: Aug. 23, 2016

(54) ESTIMATION OF CONVENTIONAL INERTIAL SENSOR ERRORS WITH ATOMIC INERTIAL SENSOR

(71) Applicant: Honeywell International Inc., Morristown, NJ (US)

(72) Inventors: Robert H. Fall, St. Petersburg, FL (US); Barton McJunkin, Redmond, WA (US); Mitchell Novack, Kenmore, WA (US)

(73) Assignee: Honeywell International Inc., Morris Plains, NJ (US)

(*) Notice: Subject to any disclaimer, the term of this patent is extended or adjusted under 35 U.S.C. 154(b) by 923 days.

(21) Appl. No.: 13/713,384

(22) Filed: Dec. 13, 2012

(65) Prior Publication Data

US 2013/0218504 A1 Aug. 22, 2013

Related U.S. Application Data

(60) Provisional application No. 61/600,290, filed on Feb. 17, 2012.

(51) Int. Cl.
| | |
|---|---|
| *G01C 19/00* | (2013.01) |
| *G01C 25/00* | (2006.01) |
| *G01C 19/58* | (2006.01) |
| *G01C 21/16* | (2006.01) |
| *G01P 21/00* | (2006.01) |

(52) U.S. Cl.
CPC ............... *G01C 25/00* (2013.01); *G01C 19/58* (2013.01); *G01C 21/16* (2013.01); *G01C 25/005* (2013.01); *G01P 21/00* (2013.01)

(58) Field of Classification Search
None
See application file for complete search history.

(56) References Cited

U.S. PATENT DOCUMENTS

| | | | |
|---|---|---|---|
| 4,157,495 A | 6/1979 | Grover et al. |
| 7,239,135 B2 | 7/2007 | Abbink et al. |
| 7,282,910 B1 | 10/2007 | Kanegsberg |
| 7,728,587 B2 | 6/2010 | Stewart et al. |
| 7,847,924 B2 | 12/2010 | Aarons et al. |
| 7,978,334 B2 | 7/2011 | Schwartz et al. |

(Continued)

FOREIGN PATENT DOCUMENTS

EP 1896796 5/2009

OTHER PUBLICATIONS

European Patent Office, "Communication under Rule 71(3) from EP Application No. 12197287.1 mailed Jun. 24, 2015", "from Foreign Counterpart of U.S. Appl. No. 13/713,384", Jun. 24, 2015, pp. 1-31, Published in: EP.

(Continued)

*Primary Examiner* — Aditya Bhat
(74) *Attorney, Agent, or Firm* — Fogg & Powers LLC

(57) ABSTRACT

Embodiments described herein provide for a method for obtaining an inertial measurement. The method includes obtaining multiple contiguous high sample rate readings during a time period from a conventional inertial sensor. Non-contiguous low sample rate reading of accumulated motion are also obtained over the time period from an atomic inertial sensor. One or more observable errors are estimated for the conventional inertial sensor based on comparing the low sample rate reading to the multiple high sample rate readings. A compensated hybrid reading is determined by compensating the high sample rate readings for the one or more observable errors based on the estimating of the one or more observable errors.

18 Claims, 4 Drawing Sheets

(56) References Cited

U.S. PATENT DOCUMENTS

| | | | |
|---|---|---|---|
| 9,030,655 B2* | 5/2015 | Strabley | G01P 21/00 356/72 |
| 2005/0004750 A1 | 1/2005 | Huddle | |
| 2010/0149541 A1 | 6/2010 | Aarons et al. | |
| 2013/0215421 A1* | 8/2013 | Stoner | G01N 21/65 356/301 |

OTHER PUBLICATIONS

European Patent Office, "Office Action from EP Application No. 12197287.1 mailed Dec. 18, 2014", "from Foreign Counterpart of U.S. Appl. No. 13/713,384", Dec. 18, 2014, pp. 1-6, Published in: EP.

European Patent Office, "EP Search Report from EP Application No. 12197287.1 mailed Dec. 1, 2014", "from Foreign Counterpart of U.S. Appl. No. 13/713,384", Dec. 1, 2014, pp. 1-3, Published in: EP.

Jekeli, "Cold Atom Interferometer as Inertial Measuerment Unit for Precision Navigation", "Laboratory for Space Geodesy and Remote Sensing Research", Jun. 7-Jun. 9, 2004, pp. 604-613, Publisher: Ohio State University, Published in: US.

Geiger et al., "Detecting inertial effects with airborne matter-wave interferometry", Sep. 20, 2011, pp. 1-7, Publisher: Nature Communications.

* cited by examiner

ESTIMATION OF CONVENTIONAL INERTIAL SENSOR ERRORS WITH ATOMIC INERTIAL SENSOR

CROSS-REFERENCE TO RELATED APPLICATIONS

This application claims the benefit of U.S. Provisional Patent Application Ser. No. 61/600,290, filed on Feb. 17, 2012, which is hereby incorporated herein by reference.

STATEMENT REGARDING FEDERALLY SPONSORED RESEARCH OR DEVELOPMENT

This invention was made with Government support under FA9453-05-C-0241 awarded by the Air Force Research Laboratory. The Government has certain rights in the invention.

BACKGROUND

Atomic inertial sensors (e.g., cold atom accelerometers and gyroscopes) have potential to provide very accurate, high resolution sensing, however, they have limitations imposed by sampled, destructive readout of accumulated motion over short time periods in their normal mode of operation involving cooling and measurement cycles of constrained and divided Bose-Einstein condensate or other suitably prepared groups of atoms. This is not typically a constraint for use in gravimetric or very low g applications with very limited bandwidth and range, but restricts their usefulness in ballistic and aircraft navigation applications due to low bandwidth and gaps between samples while atom cooling is performed.

Conventional inertial sensors, such as a vibratory structure gyroscope, a fiber optic gyroscope, or a resonating beam accelerometer, can operate at a higher bandwidth, but are subject to bias, scale factor, or other errors that can vary significantly over time and environmental changes resulting in substantial drift of measurement readings.

Proposals have been made to use both a cold atom accelerometer and a conventional accelerometer together. One such proposal recognized the theoretical usefulness of the cold atom accelerometer to provide a precision reference to improve measurements from a conventional accelerometer via a frequency/bandwidth domain weighted filtering scheme.

SUMMARY

Embodiments described herein provide for a method for obtaining an inertial measurement. The method includes obtaining multiple contiguous high sample rate readings during a time period from a conventional inertial sensor. Non-contiguous low sample rate reading of accumulated motion are also obtained over the time period from an atomic inertial sensor. One or more observable errors are estimated for the conventional inertial sensor based on comparing the low sample rate reading to the multiple high sample rate readings. A compensated hybrid reading is determined by compensating the high sample rate readings for the one or more observable errors based on the estimating of the one or more observable errors.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Embodiments disclosed herein provide for systems and methods for an atomic inertial sensor coupled with a suitable conventional inertial sensor to provide enhanced operation of both by providing gap-free readout capability of measurements, continuous recalibration of error sources and extended operational range, thereby creating a synergistic measurement system with significantly improved accuracy over existing conventional technologies. In particular, embodiments disclosed herein provide a means for estimating and/or compensating for observable sensor errors of a conventional inertial sensor using readings from an atomic sensor. Previous proposed combinations of atomic and conventional sensors did not perform such estimation or compensation.

Figure 1:
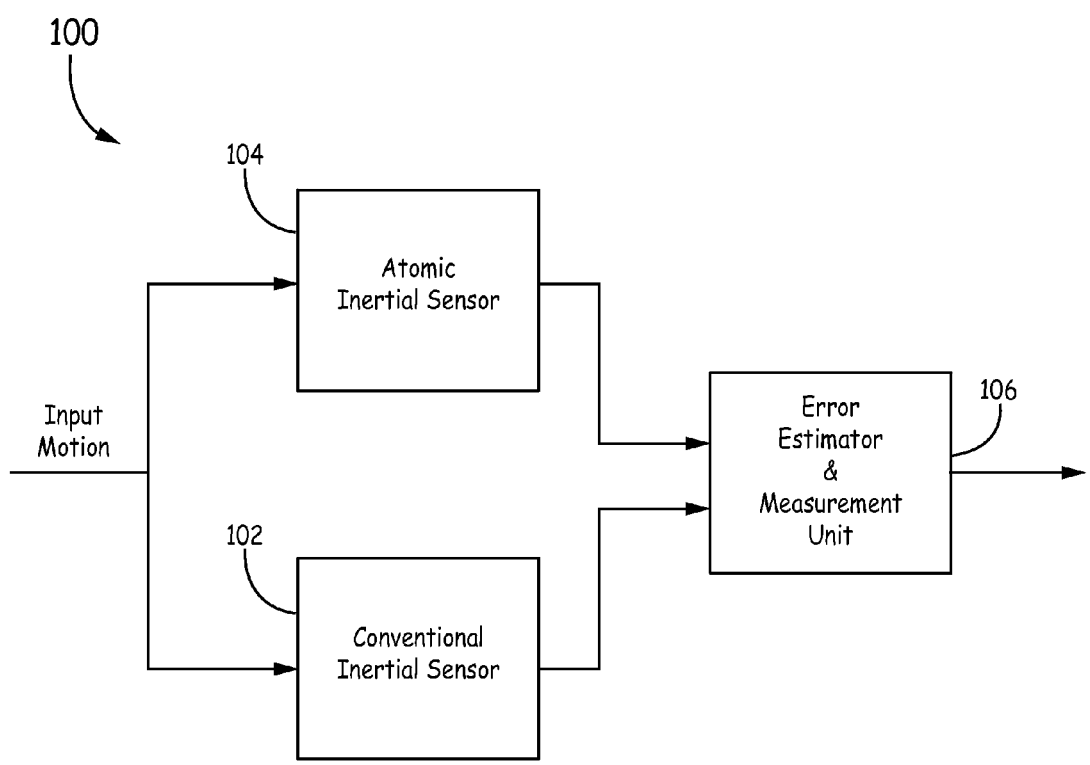
FIG. 1 is a block diagram of an example inertial measurement unit (IMU) combining measurements from a conventional inertial sensor and an atomic inertial sensor.

FIG. 1 is a block diagram of an example inertial measurement unit 100 including a conventional inertial sensor 102 and an atomic inertial sensor 104 forming an inertial sensor pair. The conventional inertial sensor 102 is an integrated device that senses the motion of a mechanical structure or a timing of light around a path to discern either acceleration or rotation of the device. The atomic inertial sensor 104 in contrast, is a device that analyzes the accumulated motion of an atom cloud over a period of time to discern acceleration and/or rotation. The conventional inertial sensor 102 and the atomic inertial sensor 104 can comprise either accelerometers or gyroscopes; however, the conventional inertial sensor 102 and the atomic inertial sensor 104 must sense the same type of motion (acceleration or rotation) as one another in order to provide complementary measurements. In addition to sensing the same type of motion, the conventional inertial sensor 102 and the atomic inertial sensor 104 are configured to sense the same motion to first order. For example, the conventional inertial sensor 102 and the atomic inertial sensor 104 are oriented to sense motion to nominally identical axes (i.e., axes of acceleration of axes or rotation).

Examples of conventional inertial sensors include a vibratory structure gyroscope (e.g., a proof mass with a hemispherical, wine glass, or other geometry that is affected by Coriolis force), a fiber optic gyroscope (e.g., an interferometric or resonator fiber optic gyroscope), a resonating beam accelerometer (e.g., a tuning fork resonator), rotating mass and ring laser gyroscopes, and a pendulous force rebalance accelerometer. In many cases, the conventional inertial sensor 102 will be a micro-electro-mechanical system (MEMS). Examples of an atomic inertial sensor 104 include a cold atom accelerometer and a cold atom gyroscope.

The conventional inertial sensor 102 obtains readings corresponding to motion and provides the readings to an error estimator and measurement solution unit 106. The error estimator and measurement solution unit 106 also receives readings from the atomic inertial sensor 104. The error estimator and measurement solution unit 106 can estimate observable errors for the conventional inertial sensor 102 and determine a measurement solution (also referred to herein as a compensated hybrid reading) by comparing the readings from the conventional and atomic inertial sensors 102, 104 and compensating the contiguous, high bandwidth measurements from the conventional inertial sensor 102 for the estimated observable errors. The error estimator and measurement solution unit 106 outputs the contiguous, compensated, high bandwidth measurement solution.

The conventional inertial sensor 102 is configured to obtain readings at a higher bandwidth (which readings are also referred to herein as high bandwidth readings) than the atomic inertial sensor 104 (which readings are also referred to herein as non-contiguous, low bandwidth readings). In an example, the conventional inertial sensor 102 is configured to obtain readings at a rate of about 500 Hz (0.002 second period) and the atomic inertial sensor 104 is configured to obtain readings at a rate of about 0.1 Hz (10 second period) over a measurement duration of 0.01 second with sample rates and measurement durations for both sensors synchronized, for example, by a common clock signal. Other example bandwidths can also be used. In any case, a reading obtained by the atomic inertial sensor 104 corresponds to the accumulated motion over a time period referred to herein as a measurement duration. The atomic inertial sensor 104 measurement duration is the time period from when an atom cloud is released (dropped) until the atom cloud is sampled to obtain an indication of motion for the atom cloud. A single reading from the atomic inertial sensor 104 corresponds to the accumulated motion over the measurement duration. During that same measurement duration, multiple readings can be obtained from the conventional inertial sensor 102. A sample period (inverse of sample rate) is the time it takes for the atomic inertial sensor 104 to cool or otherwise prepare an atom cloud for measurement use and to perform the measurement. In an example, the conventional inertial sensor 102 is configured to obtain at least 3 (e.g., 5) periodic readings during the 0.01 second measurement duration and 50 period readings over the 0.1 second sample period. The atomic inertial sensor 104 can be optimized for the expected input range and desired sample rate.

In order to accurately compare a reading from the atomic inertial sensor 104 with readings from the conventional inertial sensor 102, the error estimator and measurement solution unit 106 selects the readings from the conventional inertial sensor 102 that were obtained during the measurement duration corresponding to the reading from the atomic inertial sensor 104. By using these selected readings from the conventional inertial sensor 102, the readings from the conventional inertial sensor 102 and the atomic inertial sensor 104 are synchronized, corresponding to the same motion and can therefore be accurately compared.

In an example, the selected readings from the conventional inertial sensor 102 corresponding to the measurement duration for a reading from atomic inertial sensor 104 are normalized and then integrated to determine a conventional accumulated motion measurement for the measurement duration. The conventional accumulated motion measurement for the measurement duration is compared to the reading from the atomic inertial sensor 104. A difference between the reading from the atomic inertial sensor 104 and the conventional accumulated motion measurement is used to estimate the observable errors for the conventional inertial sensor 102. In an accelerometer example, the reading from the atomic inertial sensor 104 and the accumulate motion measurement from the conventional inertial sensor 102 can then be differenced in the velocity domain. Since the measurement fidelity and resolution of the atomic inertial sensor 104 far exceeds that of the conventional inertial sensor 102, the reading from the atomic inertial sensor 102 can be used as the true velocity.

The error estimator and measurement solution unit 106 can correct for all observable and known error sources of the conventional inertial sensor 102. In an example, the error estimator and measurement solution unit 106 can then estimate scale factor and bias errors of a conventional inertial sensor 102 based on the readings (samples) from its paired (i.e., having the same measurement axis) atomic inertial sensor 104. The error estimator and measurement solution unit 106 can compensate the readings of the conventional inertial sensor 102 to account for the changing scale factor and bias errors and can provide the compensated readings for further processing (e.g., system navigation Kalman filter). The error estimator and measurement solution unit 106 can employ an estimation scheme to update scale factor, bias, etc. The compensated readings can then be used for navigation. The error estimator and measurement solution unit 106 can perform this process for each pair of a conventional inertial sensor 102 and atomic inertial sensor 104.

Figure 2:
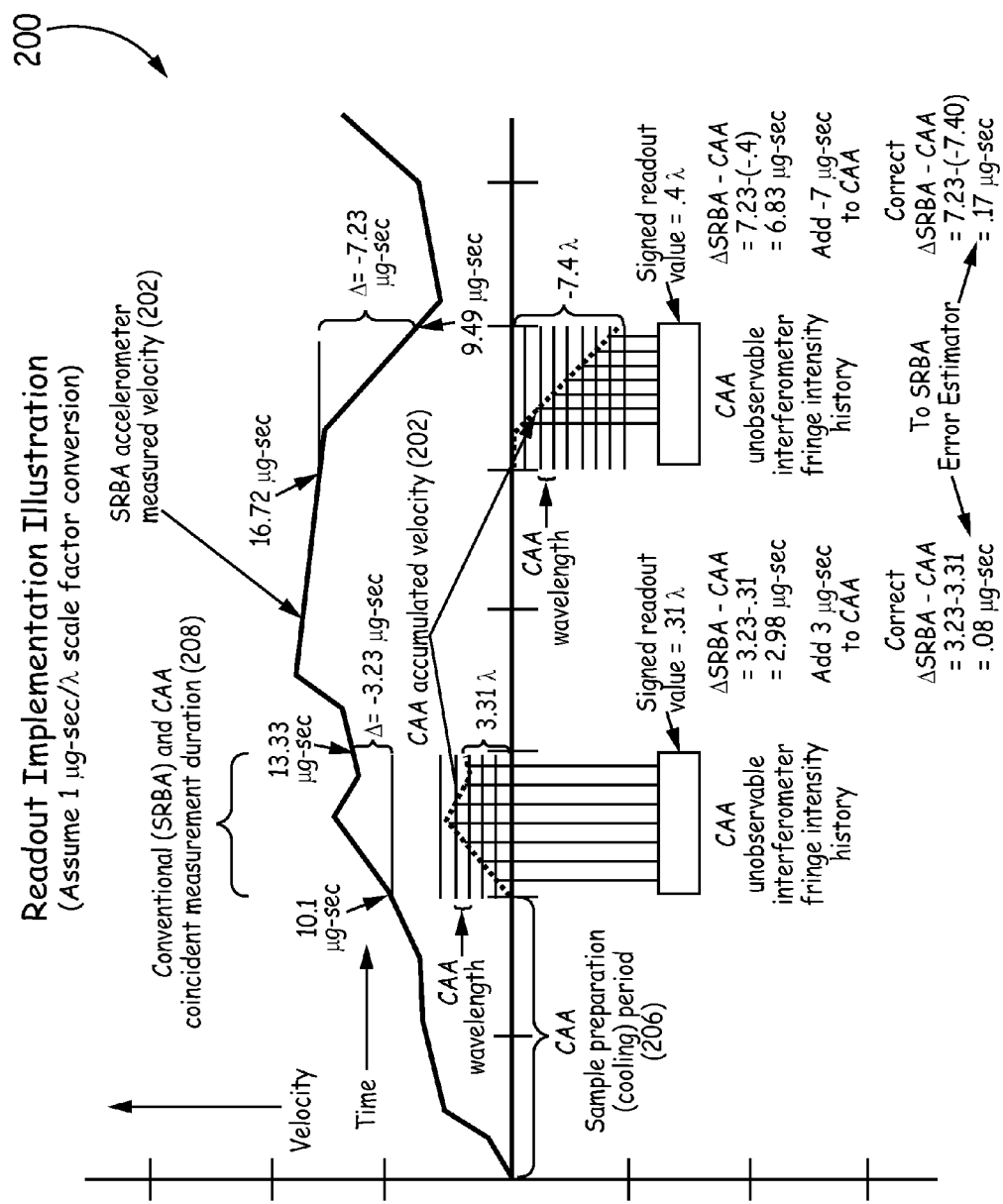
FIG. 2 is an example readout implementation during operation of the IMU of FIG. 1.

FIG. 2 is a graph 200 of an example readout implementation during operation of the inertial measurement unit 100. Curve 202 corresponds to readings from the conventional inertial sensor 102 and dots 204 correspond to accumulated motion of an atom cloud in the atomic inertial sensor 104 during a measurement duration. Graph 200 corresponds to an example where conventional inertial sensor 102 and atomic inertial sensor 104 are accelerometers and accordingly illustrates velocity. In operation, the conventional inertial sensor 102 can obtain readings at a predetermined rate.

The atomic inertial sensor 102 goes through a sample preparation interval 206 to prepare the atom cloud for release. This includes preparing (cooling) the atomic cloud. After a predetermined interval when the atomic cloud is properly prepared, the atomic inertial sensor 104 can split the cloud into two clouds for the measurement process (also referred to herein as "release" or "drop" the atom cloud). The release of the atom cloud starts a measurement duration 208 throughout which the atom cloud is affected by the accumulated motion (e.g., velocity). The measurement duration 208 ends when the atom cloud is sampled to obtain a reading corresponding to the accumulated motion during the measurement duration 208. For atomic inertial sensors 104 that are accelerometers, the atomic inertial sensors 104 measure velocity as a wavelength (phase) difference between the two atomic clouds as the potential energy difference inherent in moving and holding them apart in the presence of a force that acts on each as a single pseudo particle having a quantum wave function. The wave function is then determined by the total chemical and potential energy and the phase difference between the two clouds is then proportional to the integral of the applied acceleration (velocity) over the measurement duration 208 while they are separated. At the end of the measurement duration 208 for the atomic inertial sensor 104, the two clouds are recombined and a laser interferometer measures the relative phase difference from the interference pattern peak separation.

After sampling the atom cloud, the atomic inertial sensor 104 enters another sample preparation interval to prepare another atom cloud for release. The second atom cloud is released starting at a second measurement duration. The cycle of preparing, releasing, and sampling atom clouds can continue. During the sample preparation interval 206 and the measurement duration 208, the conventional inertial sensor 102 is continuing to obtain readings. These readings are provided to the error estimator and measurement solution unit 106, which can determine a measurement solution based on the readings. The measurement solution corresponds to the inertial motion (e.g., acceleration or rotation) sensed by the conventional inertial sensor 102 and the atomic inertial sensor 104.

As mentioned above, the error estimator and measurement solution unit 106 compares the readings from the conventional inertial sensor 102 corresponding to the measurement duration 208 to the reading from the atomic inertial sensor 104 for the measurement duration 208. The difference between the accumulated motion of the readings from the conventional inertial sensor 102 and the reading of the atomic sensor 104 is used to estimate the observable sensor errors of the conventional inertial sensor 102.

In an example, measurement duration for the atomic inertial sensor 104 is selected to be longer than a time period in which separated atom clouds of the atomic inertial sensor accumulate one wavelength of phase difference prior to sampling. This enables even more accurate readings from the atomic inertial sensor 104; however, once an integer wavelength is exceeded the total accumulated velocity in the atomic inertial sensor 104 becomes ambiguous and can be any integer multiple of phase. In an example, the error estimator and measurement solution unit 106 uses the readings from the conventional inertial sensor 102 corresponding to the measurement duration to resolve the phase ambiguity of the reading from the atomic inertial sensor 104. The conventional inertial sensor 102 is selected such that it has velocity domain resolution and accumulated errors, including readout noise, to resolve less than ½ of the interference pattern of a cloud pair in the atomic inertial sensor 104 at the largest expected acceleration input over the selected measurement duration. The readings from the conventional inertial sensor 102 can then be used to resolve the phase ambiguity of the reading from the atomic inertial sensor 104.

For example, the error estimator and measurement solution unit 106 can compare a conventional accumulated motion measurement based on the readings from the conventional inertial sensor 102 to the reading of the atomic inertial sensor 104. If there is more than one wavelength of velocity difference between the two, integer wavelengths are added to (or subtracted from) the reading of the atomic inertial sensor 104 until it is less than ½ wavelength from the conventional accumulated motion measurement. This effective extension of the usable measurement duration is still limited by the coherence time of the atomic clouds, but can be significantly longer at high g levels than that determined solely by requiring that the sample period be less than that required to integrate up to a single expected interference wavelength.

This can extend the useful g level of the atomic inertial sensor 104 and reduce the impact of the readout noise of the conventional inertial sensor 102. This allows the atomic inertial sensor 104 to effectively be utilized in a high g, high dynamic environment to confer upon the conventional inertial sensor 102 most of its accuracy, with a loss of resolution. In many applications, appropriate time domain filtering can recover additional resolution, but many navigation applications over extended durations are more driven by low frequency accelerometer errors than by readout noise or quantization errors.

Once the error estimator and measurement solution unit 106 has estimated observable errors for the measurement index, the observable errors for future readings from the conventional inertial sensor 102 can be compensated for by subtracting the estimate observable errors therefrom. For example, once observable errors are estimated for the readings corresponding to the measurement duration 208, readings obtained after the measurement duration 208, such as during the next sample preparing interval, can have the estimated observable errors subtracted therefrom to yield compensated for measurement solutions output by the error estimator and measurement solution unit 106. The estimated observable errors can then be updated based on the comparison of the readings from the conventional inertial sensor 102 during the next measurement duration of the atomic inertial sensor 104. As should be understood more complex methods of estimating and compensating for the observable errors may be used based on comparisons between readings from the conventional inertial sensor 102 and the atomic inertial sensor 104 over time. The error estimator and measurement solution unit 106 can continue to estimate and compensate for the observable sensor errors over time as readings from the conventional inertial sensor 102 and the atomic inertial sensor 104 are obtained.

In an example, the estimated observable errors include one or more of a bias, a scale factor, scale factor nonlinearities, and input axis alignment for the conventional inertial sensor 102. In other examples, other observable errors can be estimated. In an example, the error estimate and measurement solution unit 106 is implemented with a Kalman filter.

Figure 3:
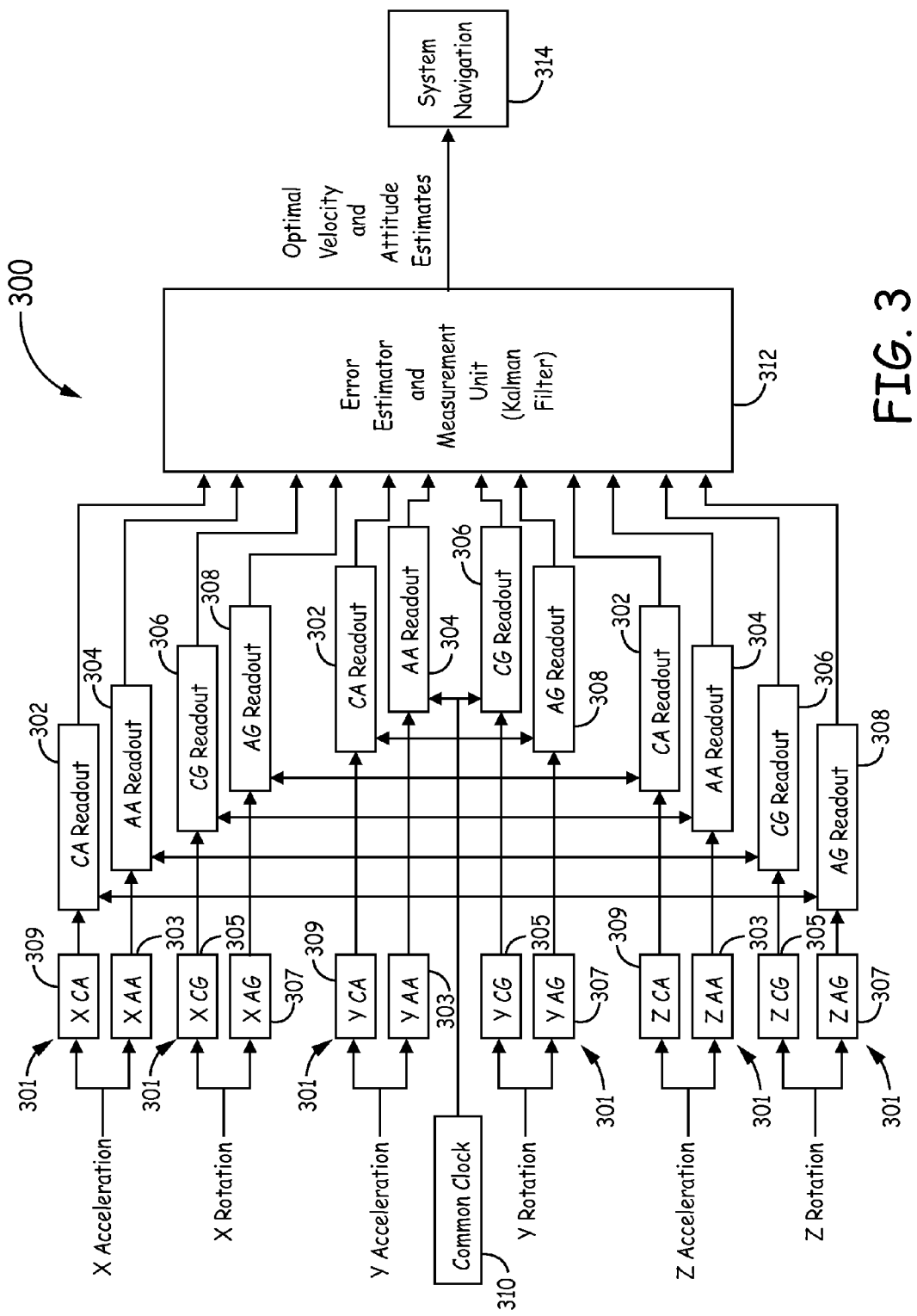
FIG. 3 is a block diagram of an example inertial measurement unit combining measurements from multiple conventional inertial sensors and multiple atomic inertial sensors.

FIG. 3 is a block diagram of an example inertial measurement unit (IMU) 300 including multiple inertial sensor pairs 301. Each inertial sensor pair 301 comprises an inertial sensor pair including a conventional accelerometer 309 and an atomic accelerometer 303 or a conventional gyroscope 305 and an atomic gyroscope 307 configured to sense the same motion with respect to the same axis as describe above with respect to FIGS. 1 and 2. In an example, the IMU 300 includes six inertial sensor pairs 301; each pair is configured to sense either acceleration or rotational motion with respect to one of three orthogonal axes (X, Y, Z). Accordingly, three dimensional motion measurements can be obtained. In an alternative example, other numbers of inertial sensor pairs, such as twelve inertial sensor pairs, are included in order to, for example, provide redundancy or enhance accuracy. In such redundant inertial sensor examples, the redundant measurements can be weighted in accordance with appropriate redundancy management algorithms.

Each conventional inertial sensor 309, 305 and atomic inertial sensor 303, 307 have associated readout electronics 302, 304, 306, 308 to provide readouts from the respective accelerometers 309, 305 and gyroscopes 303, 307. In an example, a single clock 310 is configured to provide a clock signal to all of the associated readout electronics 302, 304, 306, 308. The single clock 310 can drive the sample times for the conventional inertial sensors 309, 305 and be used to determine the sample preparation time and measurement duration of the atomic inertial sensors 303, 307. Using a single clock 310 for all the sensors 309, 303, 305, 307 ensures that readings from the respective sensors 309, 303, 305, 307 are taken over the same time period (the measurement duration).

The IMU 300 also includes an error estimator and measurement solution unit 312 that performs as the error estimator and measurement solution unit 106 described above except the error estimator and measurement solution unit 312 processes signals from six inertial sensor pairs 301. The error estimator and measurement solution unit 312 is configured to receive readings from the readout electronics 302, 304, 306, 308 associated with each sensor 309, 303, 305, 307. In an example, the error estimator and measurement solution unit 312 can determine the scale factor and bias compensation for the conventional inertial sensors 309, 305, based on the readings from the atomic inertial sensors 303, 307. The error estimator and measurement solution unit 312 can determine the desired error states of the conventional inertial sensors 309, 305 at the desired input and output rates and precision.

In an example, the scale factor and bias compensation can be applied to readings from the conventional inertial sensor 309, 305 and the compensated readings can be provided to a Kalman filter 314 for providing a navigation solution. In an example, the error estimator and measurement solution unit 312 is implemented with the same Kalman filter 314 that determines the navigation solution, although other estimators may be used for the error estimator and measurement solution unit 312.

The error estimator and measurement solution unit 312 can estimate and compensate for the known instabilities of the error terms of the conventional inertial sensor 309, 305. In accelerometer examples, the error estimator and measurement solution unit 312 can use discrete velocity measurements from the atomic inertial sensor 303, 307 to continuously update observable errors of the conventional inertial sensor 309, 305 such as scale factor and bias errors introduced by parameter shifts or trends over time.

Figure 4:
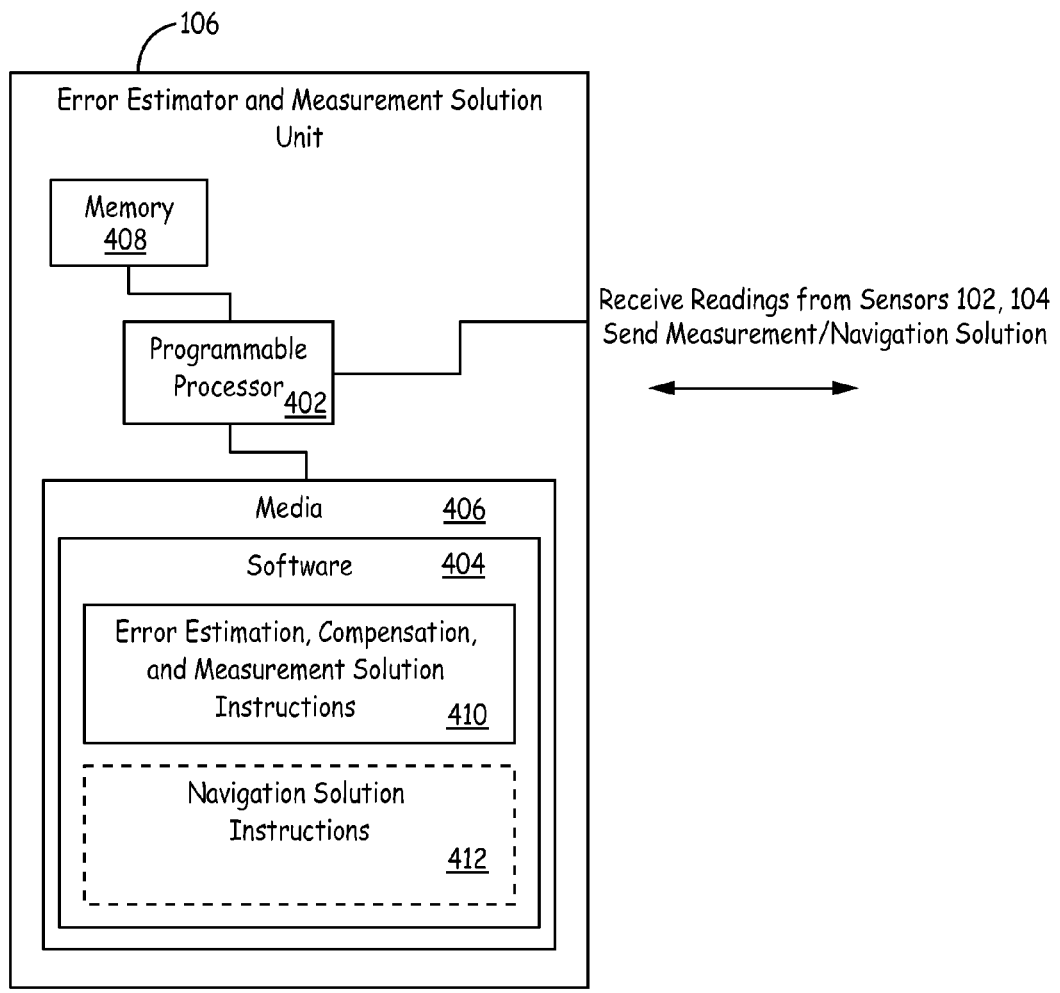
FIG. 4 is a block diagram of an example error estimator and measurement solution unit of FIG. 1.

FIG. 4 is a block diagram of an example error estimator and measurement unit 106, 312. The error estimator and measurement unit 106, 312 can include one or more processing devices 402 for executing instructions 410, 412. The one or more processing devices 402 can include a general purpose processor or a special purpose processor (e.g., a digital signal processor). The instructions 410, 412 are stored (or otherwise embodied) on or in one or more appropriate storage media 406 (such as flash or other non-volatile memory) form which the instructions are readable by the processing device(s) 402 for execution thereby. The error estimator and measurement unit 106, 312 also includes memory 408 that is coupled to the processing device(s) 402 for storing instructions (and related data) during execution by the processing device(s) 402. Memory 408 comprises, in one implementation, any suitable form of random access memory (RAM) now known or later developed, such as dynamic random access memory (DRAM). In other implementations, other types of memory are used.

The instructions on the error estimator and measurement unit 106, 312 include error estimation, compensation, and measurement solution instructions 410. In some examples, the instructions also include navigation solution instructions 412. The error estimation, compensation, and measurement solution instructions 410 are configured to cause the processing device(s) 402 to implement the functions of the error estimator and measurement unit 106, 312 described above. The navigation solution instructions 412 are configured to cause the processing device(s) 402 to implement the functions of the navigation solution unit 314 described above. In some examples, the error estimation, compensation, and measurement solution instructions 410 and the navigation solution instructions 412 are implemented in the same instruction module.

Example Embodiments

Example 1 includes a method for obtaining an inertial measurement comprising: obtaining multiple contiguous high sample rate readings during a time period from a conventional inertial sensor; obtaining a non-contiguous low sample rate reading of accumulated motion over the time period from an atomic inertial sensor; estimating one or more observable errors for the conventional inertial sensor based on comparing the low sample rate reading to the multiple high sample rate readings; and determining a compensated hybrid reading by compensating the high sample rate readings for the one or more observable errors based on the estimating of the one or more observable errors.

Example 2 includes the method of Example 1, wherein the one or more observable errors include one or more of bias, a scale factor, scale factor nonlinearities, and input axis alignments.

Example 3 includes the method of any of Example 1 or 2, wherein estimating includes using a Kalman filter to estimate the one or more observable errors and to determine a compensated hybrid reading.

Example 4 includes the method of any of Examples 1-3, wherein the time period is longer than a time period in which the separated atom clouds of the atomic inertial sensor accumulate a wavelength of phase difference; and resolving ambiguity of the phase difference of the second reading with the readings from the conventional inertial sensor.

Example 5 includes the method of any of Examples 1-4, wherein the conventional inertial sensor comprises one of a vibratory structure gyroscope, an interferometric fiber optic gyroscope (IFOG), resonator fiber optic gyroscope (RFOG), a resonating beam accelerometer, rotating mass gyroscope, ring laser gyroscope, or a pendulous force rebalance accelerometer.

Example 6 includes the method of any of Examples 1-5, wherein the atomic inertial sensor comprises one of a cold atom gyroscope or a cold atom accelerometer.

Example 7 includes the method of any of Examples 1-6, wherein obtaining multiple high bandwidth readings comprises obtaining at least 3 periodic readings during the time period.

Example 8 includes an inertial measurement unit comprising: a conventional inertial sensor; an atomic inertial sensor; one or more processing devices coupled to the one or more conventional inertial sensors and the one or more atomic inertial sensors; and one or more storage media coupled to the one or more atomic inertial sensors, the one or more storage media including instructions which, when executed by the one or more processing devices, cause the one or more processing devices to: obtain multiple high bandwidth readings of accumulated motion during a time period from the conventional inertial sensor; obtain a low bandwidth reading of accumulated motion over the time period from the atomic inertial sensor; estimate one or more observable errors for the conventional inertial sensor based on comparing the low bandwidth reading to the multiple high bandwidth readings; and determine a hybrid reading by compensating the high bandwidth reading for the one or more observable errors based on the estimating of the one or more observable errors.

Example 9 includes the inertial measurement unit of Example 8, wherein the one or more observable errors include one or more of bias, a scale factor, scale factor nonlinearities, and input axis alignments.

Example 10 includes the inertial measurement unit of Example 9, wherein estimate includes using a Kalman filter to estimate the one or more observable errors and to determine a hybrid reading.

Example 11 includes the inertial measurement unit of any of Examples 9 or 10, wherein the time period is longer than a time period in which the separated atom clouds of the atomic inertial sensor accumulate a wavelength of phase difference; and wherein the instructions cause the one or more processing devices to resolve ambiguity of the phase difference of the second reading with the readings from the conventional inertial sensor.

Example 12 includes the inertial measurement unit of any of Examples 9-11, wherein the conventional inertial sensor comprises one of a vibratory structure gyroscope, an interferometric fiber optic gyroscope (IFOG), resonator fiber optic gyroscope (RFOG), a resonating beam accelerometer, rotating mass gyroscope, ring laser gyroscope, or a pendulous force rebalance accelerometer.

Example 13 includes the inertial measurement unit of any of Examples 9-12, wherein the atomic inertial sensor comprises one of a cold atom gyroscope or a cold atom accelerometer.

Example 14 includes the inertial measurement unit of any of Examples 9-13, wherein obtain multiple high bandwidth readings comprises obtain at least 3 periodic readings during the time period.

Example 15 includes an inertial measurement unit comprising: a first inertial sensor pair including a conventional inertial sensor and an atomic inertial sensor each oriented to sense motion with respect to a first axis; a second inertial sensor pair including a conventional inertial sensor and an atomic inertial sensor each oriented to sense motion with respect to a second axis orthogonal to the first axis; a third inertial sensor pair including a conventional inertial sensor and an atomic inertial sensor each oriented to sense motion with respect to a third axis orthogonal to the first axis and the second axis; one or more processing devices coupled to the first, second, and third inertial sensor pair; and one or more storage media coupled to the one or more processing devices, the one or more storage media including instructions which, when executed by the one or more processing devices, cause the one or more processing devices to, for the first, second, and third inertial sensor pair respectively during respective time periods: obtain multiple high bandwidth readings during a time period from the conventional inertial sensor of a respective inertial sensor pair; obtain a low bandwidth reading of accumulated motion over the time period from the atomic inertial sensor of the respective inertial sensor pair; estimate one or more observable errors for the conventional inertial sensor of the respective inertial sensor pair based on comparing the low bandwidth reading to the multiple high bandwidth readings; and wherein the instructions cause the one or more processing devices to determine a three-dimensional navigation solution based on the readings from the first, second, and third sensor pair, wherein determine a three-dimensional navigation solution includes compensating for observable errors of the conventional inertial sensor of the first, second, and third inertial sensor pairs respectively based on the estimating of the one or more observable errors for that conventional inertial sensor.

Example 16 includes the inertial measurement unit of Example 15, wherein the conventional inertial sensor and the atomic inertial sensor of each of the first, second, and third inertial sensor pairs comprise accelerometers.

Example 17 includes the inertial measurement unit of Example 16, wherein the set of gyroscopes comprises: a first gyroscope pair including a conventional gyroscope and an atomic gyroscope each oriented to sense rotation with respect to a fourth axis; a second gyroscope pair including a conventional gyroscope and an atomic gyroscope each oriented to sense rotation with respect to a fifth axis orthogonal to the fourth axis; a third gyroscope pair including a conventional gyroscope and an atomic gyroscope each oriented to sense rotation with respect to a sixth axis orthogonal to the fourth axis and the fifth axis; and wherein the instructions cause the one or more processing devices to, for the first, second, and third gyroscope pair respectively during respective time periods: obtain multiple high bandwidth readings of accumulated motion during a time period from the conventional gyroscope of a respective gyroscope pair; obtain a low bandwidth reading of accumulated motion over the time period from the atomic gyroscope of the respective gyroscope pair; estimate one or more observable errors for the conventional gyroscope of the respective gyroscope pair based on comparing the low bandwidth reading to the multiple high bandwidth readings; and wherein the three-dimensional navigation solution is determined based on the rotation readings by compensating for observable errors of the conventional gyroscope of the first, second, and third gyroscope pairs respectively based on the estimating of the one or more observable errors for that conventional gyroscope.

Example 18 includes the inertial measurement unit of Example 17, comprising: redundant inertial sensor pairs to provide redundant readings of motion for enhancing reliability or accuracy.

Example 19 includes the inertial measurement unit of any of Examples 15-18, wherein the one or more observable errors comprise one or more of bias, a scale factor, scale factor nonlinearities, and input axis alignments.

Example 20 includes the inertial measurement unit of any of Examples 15-19, wherein the time period is longer than a time period in which the separated atom clouds of the atomic inertial sensor accumulate a wavelength of phase difference; and wherein the instructions cause the one or more processing devices to, for the first, second, and third inertial sensor pair respectively, resolve ambiguity of the period of the second reading with the readings from the conventional inertial sensor.

What is claimed is:

1. A method, comprising:
    obtaining, from a conventional inertial sensor during a time period, multiple contiguous high-sample-rate readings;
    obtaining, from an atomic inertial sensor over the time period, a non-contiguous low-sample-rate reading of accumulated motion, wherein the time period is longer than another time period during which separated atom clouds of the atomic inertial sensor accumulate a wavelength of phase difference;
    resolving an ambiguity in a phase of the low-sample-rate reading based on the multiple high-sample-rate readings;
    estimating one or more observable errors for the conventional inertial sensor based on comparing the low-sample-rate reading to the multiple high-sample-rate readings;
    determining a compensated hybrid reading by compensating the high-sample-rate readings for the one or more observable errors based on the estimating of the one or more observable errors; and
    implementing a navigation solution based on the compensated hybrid reading.

2. The method of claim 1, wherein the one or more observable errors include one or more of bias, a scale factor, scale-factor nonlinearities, and input axis alignments.

3. The method of claim 1, wherein estimating includes using a Kalman filter to estimate the one or more observable errors and to determine a compensated hybrid reading.

4. The method of claim 1, wherein the conventional inertial sensor comprises one of a vibratory structure gyroscope, an interferometric fiber optic gyroscope (IFOG), resonator fiber optic gyroscope (RFOG), a resonating beam accelerometer, rotating mass gyroscope, ring laser gyroscope, or a pendulous force rebalance accelerometer.

5. The method of claim 1, wherein the atomic inertial sensor comprises one of a cold atom gyroscope or a cold atom accelerometer.

6. The method of claim 1, wherein obtaining multiple high-bandwidth readings comprises obtaining at least three periodic readings during the time period.

7. An inertial measurement unit comprising:
a conventional inertial sensor;
an atomic inertial sensor;
one or more processing devices coupled to the conventional inertial sensor and to the atomic inertial sensor; and
one or more non-transitory computer-readable storage media coupled to the atomic inertial sensor and including instructions which, when executed by the one or more processing devices, cause the one or more processing devices to:
obtain, from the conventional inertial sensor during a time period, multiple high-bandwidth readings of accumulated motion;
obtain, from the atomic inertial sensor during the period of time, a low-bandwidth reading of accumulated motion, wherein the time period is longer than another time period during which separated atom clouds of the atomic inertial sensor accumulate a wavelength of phase difference;
resolve ambiguity in a phase of the low-bandwidth reading based on the multiple high-bandwidth readings;
estimate one or more observable errors for the conventional inertial sensor based on comparing the low-bandwidth reading to the multiple high-bandwidth readings;
determine a hybrid reading by compensating at least one of the high-bandwidth readings for the one or more observable errors based on the estimate of the one or more observable errors; and
provide the hybrid reading for implementing a navigation solution.

8. The inertial measurement unit of claim 7, wherein the one or more observable errors include one or more of bias, a scale factor, scale factor nonlinearities, and input axis alignments.

9. The inertial measurement unit of claim 8, wherein estimate includes using a Kalman filter to estimate the one or more observable errors and to determine a hybrid reading.

10. The inertial measurement unit of claim 8, wherein the conventional inertial sensor comprises one of a vibratory structure gyroscope, an interferometric fiber optic gyroscope (IFOG), resonator fiber optic gyroscope (RFOG), a resonating beam accelerometer, rotating mass gyroscope, ring laser gyroscope, or a pendulous force rebalance accelerometer.

11. The inertial measurement unit of claim 8, wherein the atomic inertial sensor comprises one of a cold atom gyroscope or a cold atom accelerometer.

12. The inertial measurement unit of claim 8, wherein obtain multiple high-bandwidth readings comprises obtain at least three periodic readings during the time period.

13. An inertial measurement unit comprising:
a first inertial-sensor pair including a conventional inertial sensor and an atomic inertial sensor each oriented to sense motion with respect to a first axis;
a second inertial-sensor pair including a conventional inertial sensor and an atomic inertial sensor each oriented to sense motion with respect to a second axis orthogonal to the first axis;
a third inertial-sensor pair including a conventional inertial sensor and an atomic inertial sensor each oriented to sense motion with respect to a third axis orthogonal to the first axis and the second axis;
one or more processing devices coupled to the first, second, and third inertial-sensor pairs; and
one or more non-transitory computer-readable storage media coupled to the one or more processing devices and including instructions which, when executed by the one or more processing devices, cause the one or more processing devices;
to, for the first, second, and third inertial-sensor pairs respectively during respective time periods
obtain multiple high-bandwidth readings during a time period from the conventional inertial sensor of a respective inertial-sensor pair;
obtain a low-bandwidth reading of accumulated motion over the time period from the atomic inertial sensor of the respective inertial-sensor pair; and
estimate one or more observable errors for the conventional inertial sensor of the respective inertial-sensor pair based on comparing the low-bandwidth reading to the multiple high-bandwidth readings;
to determine a three-dimensional navigation solution based on the readings from the first, second, and third sensor pairs, wherein determine a three-dimensional navigation solution includes compensating for observable errors of the conventional inertial sensor of the first, second, and third inertial-sensor pairs respectively based on the estimating of the one or more observable errors for that conventional inertial sensor; and
to provide the three-dimensional navigation solution for implementation.

14. The inertial measurement unit of claim 13, wherein the conventional inertial sensor and the atomic inertial sensor of each of the first, second, and third inertial-sensor pairs comprise accelerometers.

15. The inertial measurement unit of claim 14, comprising:
a first gyroscope pair including a conventional gyroscope and an atomic gyroscope each oriented to sense rotation with respect to a fourth axis;
a second gyroscope pair including a conventional gyroscope and an atomic gyroscope each oriented to sense rotation with respect to a fifth axis orthogonal to the fourth axis;
a third gyroscope pair including a conventional gyroscope and an atomic gyroscope each oriented to sense rotation with respect to a sixth axis orthogonal to the fourth axis and the fifth axis; and
wherein the instructions cause the one or more processing devices to, for the first, second, and third gyroscope pair respectively during respective time periods:
obtain multiple high-bandwidth readings of accumulated motion during a time period from the conventional gyroscope of a respective gyroscope pair;
obtain a low-bandwidth reading of accumulated motion over the time period from the atomic gyroscope of the respective gyroscope pair;
estimate one or more observable errors for the conventional gyroscope of the respective gyroscope pair based on comparing the low-bandwidth reading to the multiple high-bandwidth readings; and
wherein the three-dimensional navigation solution is determined based on the rotation readings by compensating for observable errors of the conventional gyroscope of the first, second, and third gyroscope pairs respectively based on the estimating of the one or more observable errors for that conventional gyroscope.

16. The inertial measurement unit of claim 15, comprising redundant inertial-sensor pairs to provide redundant readings of motion for enhancing reliability or accuracy.

17. The inertial measurement unit of claim 13, wherein the one or more observable errors comprise one or more of bias, a scale factor, scale factor nonlinearities, and input axis alignments.

18. The inertial measurement unit of claim 13 wherein,
the time period is longer than another period in which the separated atom clouds of the atomic inertial sensor accumulate a wavelength of phase difference; and
the instructions cause the one or more processing devices to, for the first, second, and third inertial-sensor pairs respectively, resolve ambiguity of the period of the low-bandwidth reading with the readings from the conventional inertial sensor in the inertial-sensor pair.

* * * * *